United States Patent [19]
Hoshiyama

[11] Patent Number: 5,644,399
[45] Date of Patent: Jul. 1, 1997

[54] APPARATUS FOR MEASURING DIMENSION OF ARTICLE AND SCALE TO BE USED IN THE SAME

[75] Inventor: Hiroki Hoshiyama, Shizuoka, Japan

[73] Assignee: Japan EM Co., Ltd., Japan

[21] Appl. No.: 562,733

[22] Filed: Nov. 27, 1995

[30] Foreign Application Priority Data

Nov. 15, 1995  [JP]  Japan ................................. 7-297163

[51] Int. Cl.⁶ .................................................. G01B 11/00
[52] U.S. Cl. ............................................. 356/372; 356/397
[58] Field of Search ................................... 356/372, 375, 356/374, 396, 397, 394; 382/145; 348/87, 126

[56] References Cited

U.S. PATENT DOCUMENTS

| | | | |
|---|---|---|---|
| 2,650,518 | 9/1953 | Jaroff et al. | 356/397 |
| 4,172,662 | 10/1979 | Vogel | 356/397 |
| 4,393,401 | 7/1983 | Gorenflo et al. | 356/397 |

FOREIGN PATENT DOCUMENTS

0116402  5/1989  Japan .

*Primary Examiner*—Hoa Q. Pham
*Attorney, Agent, or Firm*—Rogers & Killeen

[57] ABSTRACT

A scale has marks of a point-symmetrical shape which are arranged in matrix. The scale and an article to be measured in dimension are positioned without any relative movement. An image sensor unit detects a predetermined portion of the article and the marks of the scale corresponding to the predetermined portion of the article selectively and successively, and the image sensor unit generates output signals in accordance with the detected results of the article and the scale. The output signals are processed to calculate the dimension of the article. An apparatus for measuring the dimension of an article is provided which can eliminate the occurrence of parallax, resulting in satisfactorily improved precision of the measurement. In the apparatus, an article and a marker are disposed so that the optical distance between the article and a reading unit is equal to the optical distance between the marker and the reading unit.

7 Claims, 6 Drawing Sheets

APPARATUS FOR MEASURING DIMENSION OF ARTICLE AND SCALE TO BE USED IN THE SAME

FIELD OF THE INVENTION

The invention relates to an apparatus for measuring dimension, angle, distance, size etc. (defined "dimension" simply hereinafter) of an article and a scale to be used in the same, and more particularly to, an apparatus for improving precision in measuring dimension of an article regardless of a portion of the article to be measured and a scale to be used in the same.

BACKGROUND OF THE INVENTION

Figure 6:
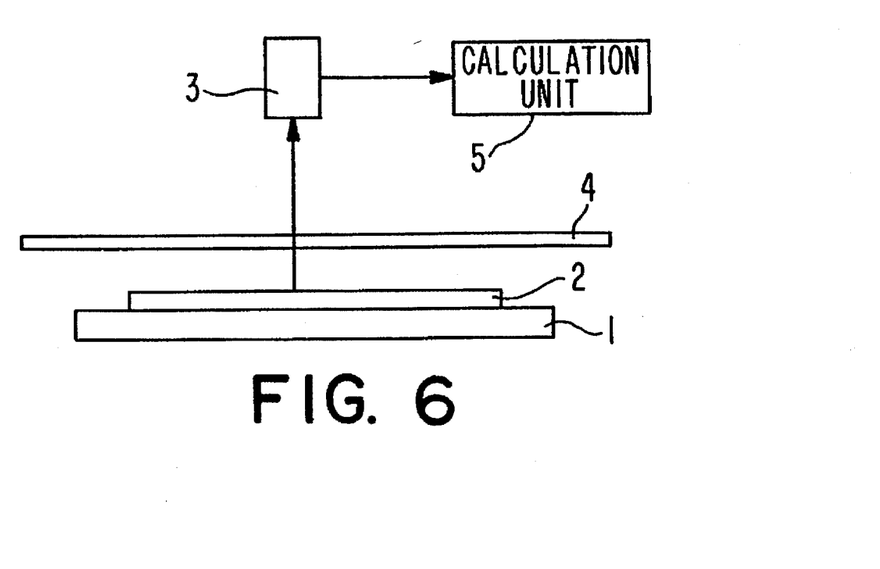
FIGS. 6 and 7 are explanatory diagrams showing conventional apparatuses for measuring dimension of an article.
Figure 7:
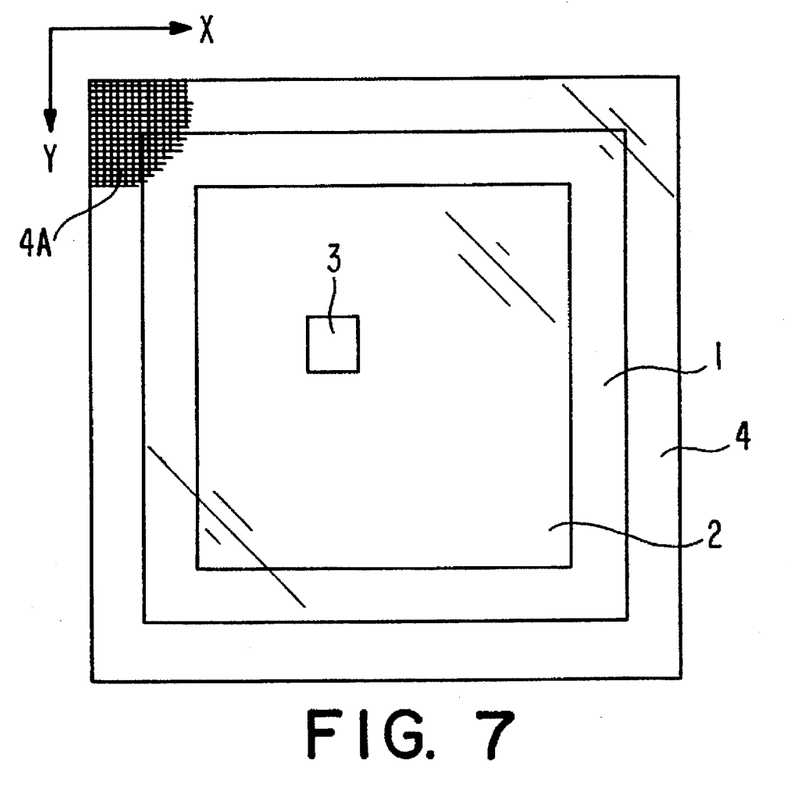

A conventional apparatus for measuring dimension of an article is described in the Japanese Patent Publication No. 5-85004 published on Dec. 6, 1993. With reference to FIGS. 6 and 7, conventional apparatus for measuring dimension of an article comprises X- and Y-transparent scale plates 4 having marks for scales 4B, a mount plate 1 for placing a rectangular sheet article 2 to be measured thereon, a light equipment for radiating light to the article placed on the transparent scale plates, and X-, Y- and origin image sensors 3 for receiving light transmitted through the X- and Y-transparent scale plates.

In operation, the rectangular sheet article is placed on the mount plate, such that first and second orthogonal sides of the rectangular sheet article are positioned on inner portions of the X- and Y-transparent scale plates, and a vertex defined by the first and second orthogonal sides is positioned on an inner portion of a crossing area of the X- and Y-transparent scale plates. Then, light is radiated from the light equipment to the X- and Y-transparent scale plates, so that light transmitted through outer portions of the X- and Y-transparent scale plates and an outer portion of the crossing area is received by X-, Y- and origin image sensors. In accordance with output signals of the X-, Y- and origin image sensors, a position of the vertex defined by the first and second orthogonal sides of the rectangular sheet article, and positions of two other vertexes defined by the second side and a third side of the rectangular sheet article, and by the first side and a fourth side of the rectangular sheet article are determined relative to the scales of the X- and Y-transparent scale plates. Consequently, lengths of the first to fourth sides of the rectangular sheet article, lengths of diagonal lines of the rectangular sheet article and vertex angles of the rectangular sheet article are obtained in accordance with the calculation of using the positions of the three vertexes of the rectangular sheet article.

In the conventional apparatus for measuring dimension of an article, however, there are disadvantages in that, for instance, a distance between two arbitrary points on the rectangular sheet article is impossible to be measured, because the positions of the vertexes are detected by using the X- and Y-transparent scale plates, and any pattern defined on the rectangular sheet article can not be measured, even if the pattern is positioned in the vicinity of the first and second sides, because each of the X- and Y-image sensors can not discriminate the pattern from the marks for the scales due to the structure in which the rectangular sheet article is positioned directly on the X- and Y-scale plates.

SUMMARY OF THE INVENTION

Accordingly, it is an object of the invention to provide an apparatus for measuring dimension of an article in which a distance between two arbitrary points on an article can be measured, even if the two points are far from, or off sides or edges of the article, and a scale to be used in the same.

It is a further object of the invention to provide an apparatus for measuring dimension of an article in which marks for a scale and a pattern defined on the article are precisely discriminated from the others to increase precision in measuring the dimension of the article, and a scale to be used in the same.

According to the feature of the invention, a scale to be used in an apparatus for measuring dimension of an article, comprises:

a table having a first flat surface on which the article to be measured is placed;

a marker plate disposed on a second flat surface parallel to the first flat surface, the marker plate having a marker representing a unit of measurement including a coordinate, a dimension or an angle;

half mirror means disposed on a third flat surface located at a position where the optical distance between the article and the half mirror means is equal to the optical distance between the marker and the half mirror means; and reading means for reading a value corresponding to an arbitrary point on the article and a value, of the marker on the marker plate, corresponding to the arbitrary point by taking advantage of light transmitted through and light reflected from the half mirror means.

BRIEF DESCRIPTION OF THE DRAWINGS

The invention will be explained in more detail in conjunction with appended drawings, wherein;

FIGS. 1A to 1H are explanatory diagrams showing an apparatus for measuring dimension of an article in a first preferred embodiment according to the invention, in which FIG. 1A shows the apparatus.

DESCRIPTION OF THE PREFERRED EMBODIMENTS

An apparatus for measuring dimension of an article in the first preferred embodiment according to the invention will be explained in FIGS. 1A to 1H.

Figure 1A:
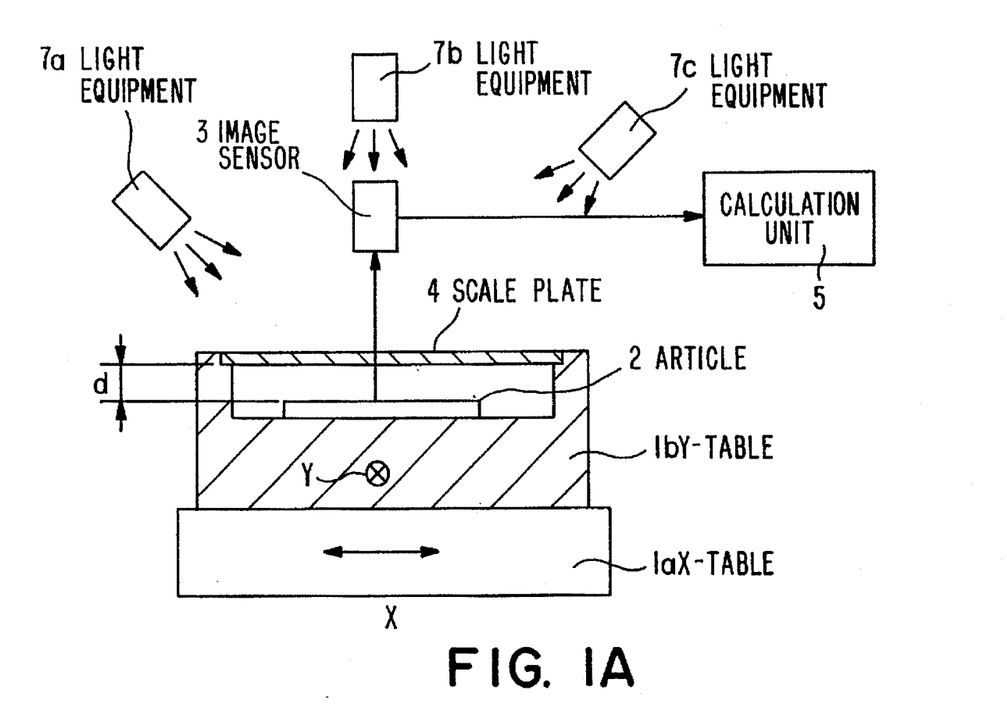

In FIG. 1A, the apparatus comprises an X-table 1a moving in the X-direction indicated by an arrow, a Y-table 1b moving in the Y-direction orthogonal to the X-direction, on which an article 2 is placed to be measured in dimension, a transparent scale plate 4 provided on the Y-table 1b to have a scale on one surface thereof, an image sensor unit 3 having a focusing system (not shown) to be focused on the article 2 and the scale of the scale plate 4 selectively, a calculation unit 5 for calculating dimension of the article 2 by receiving output signals of the image sensor unit 3, and light equipments 7a, 7b and 7c for radiating light through the scale plate to the article 2.

In the apparatus, the Y-table 1b and the scale plate 4 are designed, such that the article 2 is placed on the Y-table 1b to have a distance d greater than a focus depth of the focusing system of the image sensor unit 3 from the scale plate 4.

Figure 1B:
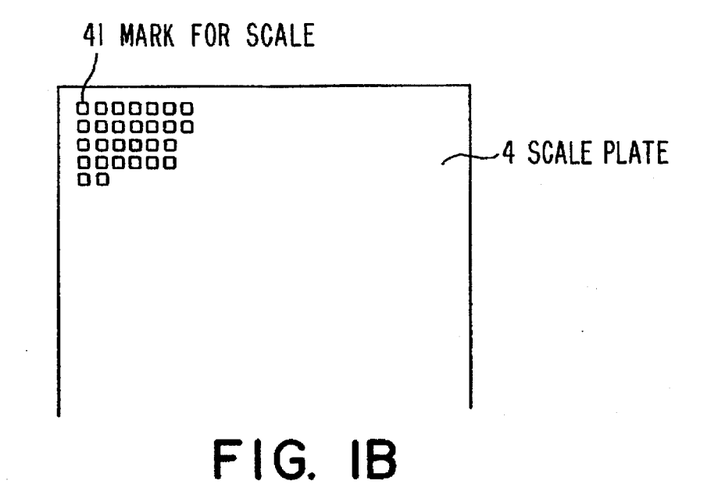
FIG. 1B shows a scale used in the apparatus.

FIG. 1B shows the transparent scale plate 4 having marks 41 for the scale arranged in matrix.

Figure 1C:
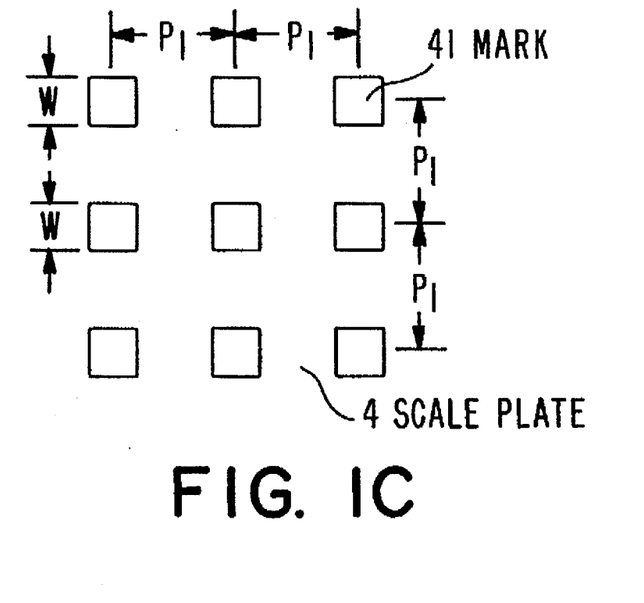
FIG. 1C shows marks for the scale.

In FIG. 1C, the marks 41 which are enlarged are of a width W and a height W, and arrayed by a pitch P1.

Figure 1D:
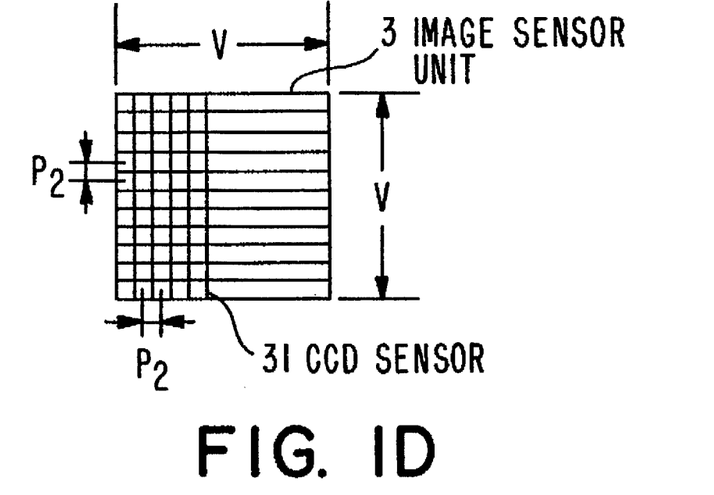
FIG. 1D shows an image sensor unit used in the apparatus.

FIG. 1D shows a view area V×V on the marks 41 of the scale plate 4 or the article 2 covered by CCD sensors 31 of the image sensor unit 3, wherein the CCD sensors 31 are arranged in matrix by a pitch $P_2$.

Figure 1E:
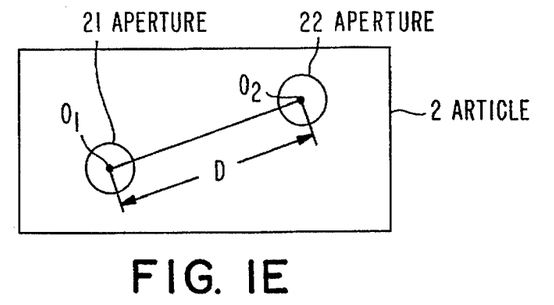
FIG. 1E shows an article to be measured in the apparatus.

FIG. 1E shows the article 2 of, for instance, a metal plate having apertures 21 and 22 formed by a distance D between the central points $O_1$ and $O_2$ thereof.

Figure 1F:
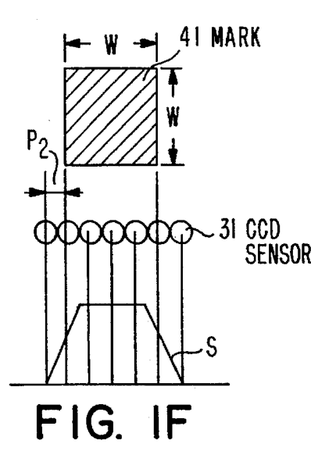
FIGS. 1F to 1H show the relation of CCD sensors of the image sensor unit to a mark of the scale in the apparatus.
Figure 1G:
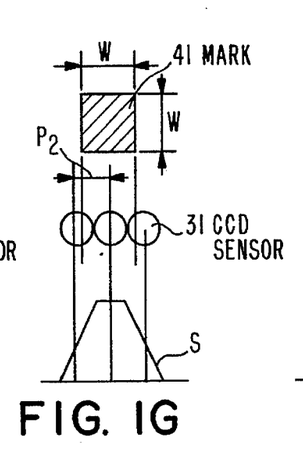
Figure 1H:
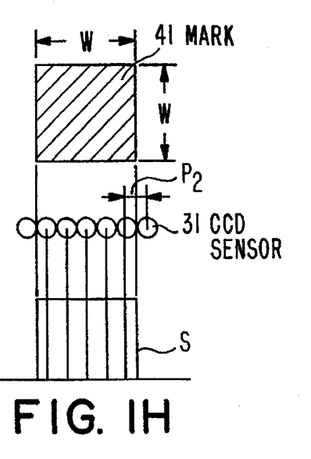

In FIGS. 1F to 1H, the CCD sensors 31 of the image sensor unit 3 detect the mark 41 of the scale plate 4, so that a detected signal S is supplied to the calculation unit 5, wherein a waveform of the output signal S depends on the relation between the width W of the mark 41 and the pitch $P_2$ of the CCD sensors 31 of the image sensor unit 3, and the relative position of the CCD sensors 31 to the mark 41.

In order to locate a specific one of the marks 41 having the same size and configuration, the conditions must be met as set out below.

$$M < P_1/2 \quad (1)$$

where M is an approximate position precision of the X- and Y-tables 1a and 1b, even if a scale other than one used in the invention is used.

$$2P_1 + W < V \quad (2)$$

This means that more than two marks 41 must be covered in the X- and Y-directions by the image sensor unit 3.

$$W < P_1/2 \quad (3)$$

This means that a ratio of the pitch $P_1$ to the width W must be less than two, so that the influence of the article 2 to an image of the marks 41, that is the deterioration of resolution is suppressed to be low.

$$2P_2 \leq W \quad (4)$$

This means that the width W must be larger relative to the pitch $P_2$ of the CCD sensors 31 by a predetermined value, that is, two times. Consequently, the central point of each mark 41 is precisely obtained in accordance with the processing of the output signals S. The relation as shown in FIG. 1G does not meet the above condition to generate the output signal S which is of a pulse-like waveform, while the relations as shown in FIGS. 1F and 1H meet the above condition to provide the output signals S which are of a step-shaped waveform.

The step-shaped waveform is advantageous in processing the output signals S, and discriminating dust on the scale plate 4 from the marks 41.

In measuring dimension of the article 2, the calculation unit 5 uses the central points of the marks 41. Therefore, the width W of the marks 41 is permissible to have deviation, because the central points thereof are not deviated due to the structure in which the marks 41 are square to be symmetrical in regard to the central points.

In this sense, the marks 41 are not limited to be square, but point-symmetrical shapes such as circle, etc.

As discussed above, one specific optimum example is as follows, W=80 μm, $P_1$=400 μm, V=1000 μm, M=100 μm, and $P_2$=2 μm.

As described in FIG. 1A, the article 2 is separated on optical axis from the marks 41 of the scale plate 4 by the predetermined distance preferably largely greater than the focus depth.

In one specific example, it is preferable that the inequality d>W/2N.A. is satisfied, when the number of aperture is N.A., and the width of the marks 41 is W.

In operation, the X- and Y-tables 1a and 1b are controlled successively to move in the X- and Y-directions, respectively, so that the aperture 21 of the article 2 is positioned below the image sensor unit 3. At this state, the aperture 21 and the marks 41 of the scale plate 4 covering the aperture 21 are focused separately by the focusing system of the image sensor unit 3. Thus, the aperture 21 and the marks 41 are detected separately by the CCD sensors 31 of the image sensor unit 3, so that output signals S are supplied therefrom to the calculation unit 5, in which the central point $O_1$ of the aperture 21 is calculated in accordance with addresses of the marks 41. Then, the X- and Y-tables 1a and 1b are moved in the X- and Y-directions, respectively, so that the aperture 22 of the article 2 is positioned below the image sensor unit 3. In the same manner as in the aperture 21, the central point $O_2$ of the aperture 22 is calculated in accordance with addresses of the marks 41 in the calculation unit 5. Then, the distance D between the central points $O_1$ and $O_2$ of the apertures 21 and 22 is calculated in accordance with the calculated positions thereof in the calculation unit 5.

In an apparatus for measuring dimension of an article in the invention, an image sensor unit 3 may be moved in the X- and Y-directions, while an article 2 and a scale may be stationary, and a magnetic detecting system may be adopted in place of the optical detecting system as adopted above.

Figure 2:
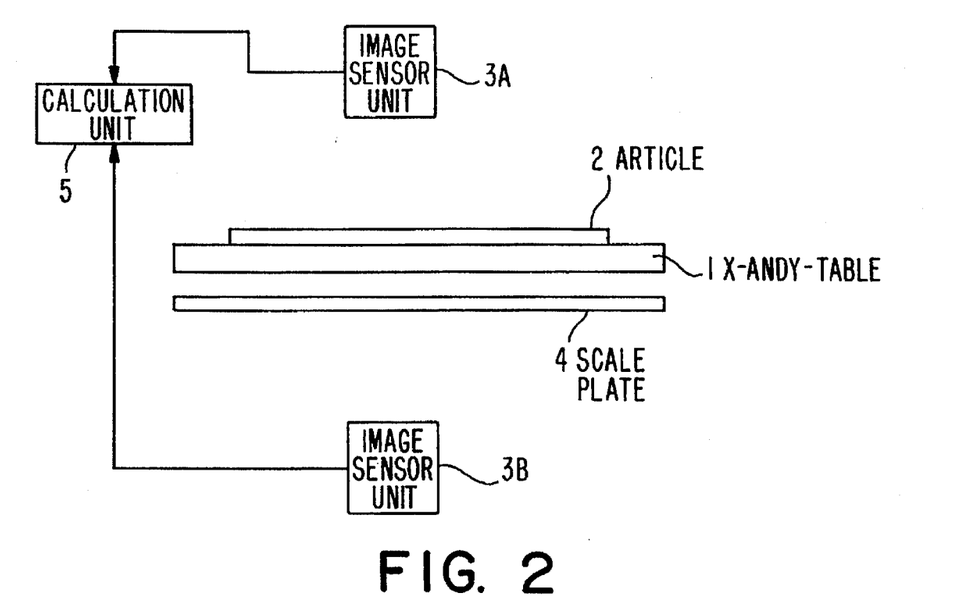
FIGS. 2 to 4 are explanatory diagrams showing apparatuses for measuring dimension of an article in second to fourth preferred embodiments according to the invention.

FIG. 2 shows an apparatus for measuring dimension of an article in the second preferred embodiment according to the invention, wherein like parts are indicated by like reference numerals as used in the first preferred embodiment, provided that the scale plate 4 having the marks for the scale is provided on the opposite site to the article 2.

In the apparatus, the X- and Y-tables are simply shown by a table 1, and the image sensor unit 3 as shown in FIG. 1A is replaced by image sensor units 3A and 3B which are provided at the same positions on the opposite sides relative to the table 1.

In operation, the article 2 and the scale plate 4 are moved to take the same positions relative to the image sensor units 3A and 3B in accordance with the X- and Y-movements of the table 1. Thus, output signals of the image sensor units 3A and 3B are supplied to the calculation unit 5, in which the output signals are processed to calculate dimension of the article 2.

Figure 3:
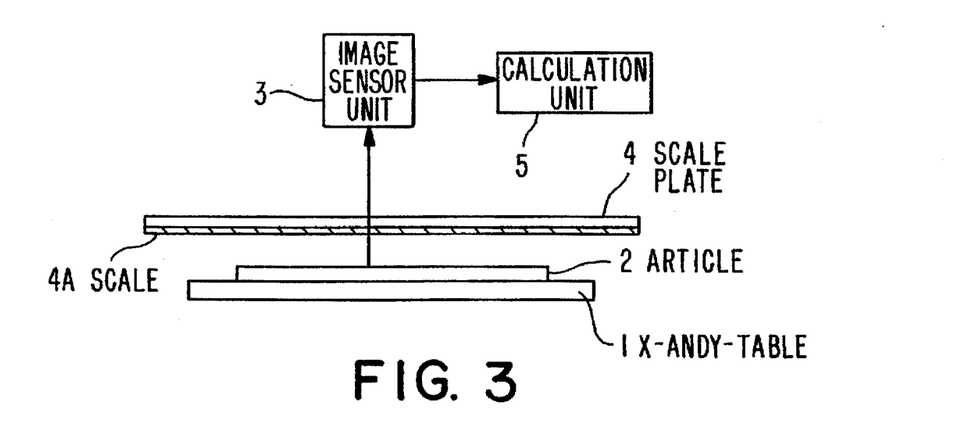

FIG. 3 shows an apparatus for measuring dimension of an article in the third preferred embodiment according to the invention, wherein like parts are indicated by like reference numerals as used in the first and second preferred embodiments.

In the apparatus, the scale plate 4 has the scale 4A on the surface facing the article 2 to increase precision in measuring dimension of the article 2 for the reason why both the article 2 and the scale 4A are detected through the scale plate 4 by the image sensor unit 3, so that the influence of a refractive index of the scale plate 4 is commonly applied to the detecting lights of the article 2 and the scale 4A. The optical conditions for the image sensor unit 3 of the scale 4A and the article 2 are different to each other. Accordingly, an image of the article 2 is diffracted at the scale plate 4, so that the optical error is occurred by this diffraction.

Figure 4:
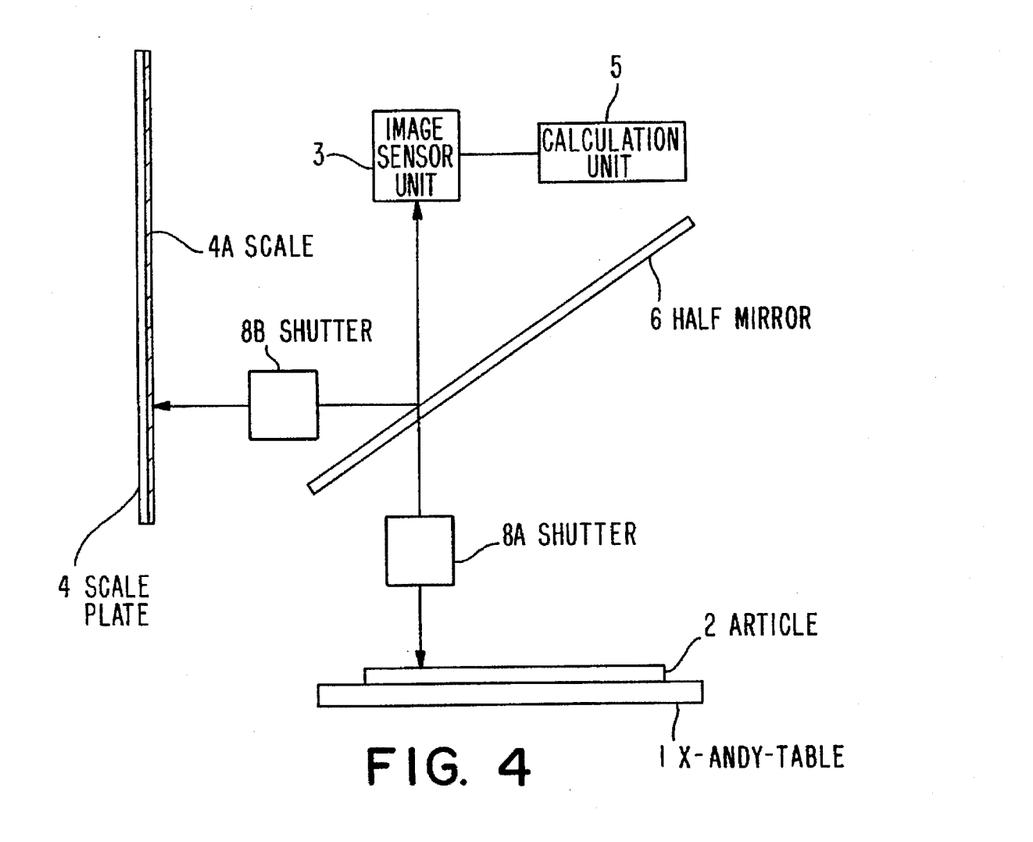

FIG. 4 shows an apparatus for measuring dimension of an article in the fourth preferred embodiment according to the invention, wherein like parts are indicated by like reference numerals as used in the first to third preferred embodiments.

In the apparatus, a half mirror 6 is provided at an angle of 45° relative to the X- and Y-table 1 and the scale table 4 having the scale 4A, and shutters 8A and 8B are provided to shut one of light paths for the scale 4A and the article 2. The shutters 8A and 8B may be omitted when other means such as using different wavelengths of lights for the scale 4A and the article 2 is adopted.

In operation, a predetermined portion of the article 2 and the relevant marks of the scale 4A are selectively detected in accordance with the switch-over of the shutters 8A and 8B by the image sensor unit 3.

In the second and fourth preferred embodiments, optical distances can be equal to decrease error.

Figure 5:
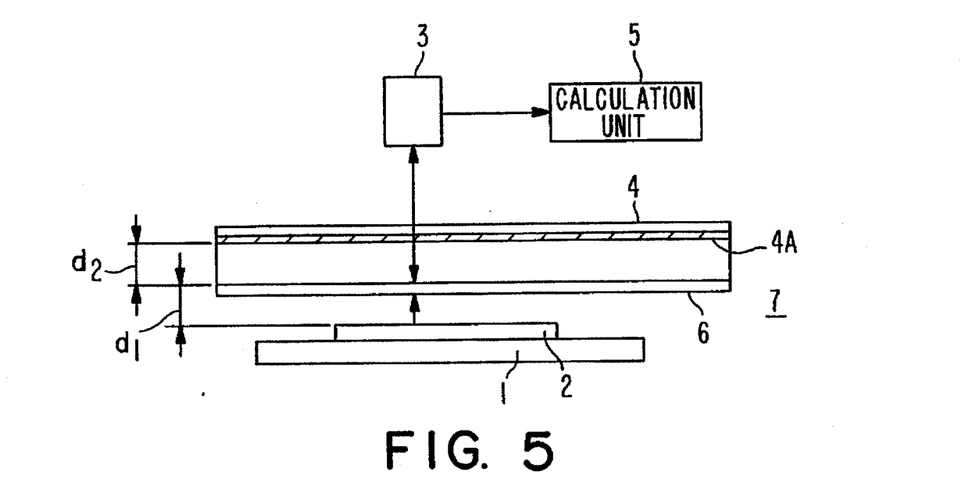
FIG. 5 is an explanatory diagram showing an apparatus for measuring the dimension of an article in a fifth preferred embodiment according to the invention.

FIG. 5 shows an apparatus for measuring the dimension of an article according to a fifth embodiment of the present invention.

This apparatus comprises: a table 1 having a horizontal surface on which an article to be measured is placed; a marker plate unit 7, disposed parallel to the table 1, comprising a marker plate 4 provided on the side of a reading unit 3 described below and a half mirror 5 provided on the side of the article 2; a reading unit 3, such as a CCD camera, for reading a value corresponding to an arbitrary point on the article 2 and a value, of a marker 4A on the marker plate 4, corresponding to said arbitrary point by taking advantage of light transmitted through and light reflected from the half mirror 6; and a calculation unit 5 for calculating the marker values read by the reading unit 3. The marker plate unit 7 is disposed so that the optical distance $d_1$, between the article 2 and the half mirror 6 is equal to the optical distance, $d_2$, between the marker 4A and the half mirror 6.

The marker plate 4 has, on its surface, a coordinate marker 4A as shown in FIG. 3 and is formed of a material through which visible light can be passed, for example, glass. The marker 4A may also be one representing a dimension, an angle or the like.

The half mirror 6 comprises a dichroic mirror of which the light reflectance and transmittance vary depending upon the wavelength.

The reading unit 3 is constructed so as to be movable in X- and/or Y-directions. A value corresponding to an arbitrary point on the article 2 and a value, of a marker 4A on the marker plate 4, corresponding to said arbitrary point are read by taking advantage of light transmitted through and light reflected from the half mirror 6.

In the apparatus having the above construction, when the reading unit 3 is moved in X- and Y-directions, it reads a arbitrary point of the article 2 on the table 1 by taking advantage of light transmitted through the half mirror 6 and, at the same time, a value, of the marker 4A on the marker plate 4, corresponding to the arbitrary point is read by taking advantage of light reflected from the half mirror 6. The reading unit 3 outputs the read marker 4A values into the calculation unit 5 which calculates the input marker 4A values to determine the dimension of the article 2.

In this case, the article 2 and the marker 4A are disposed so that the optical distance between the article 2 and the reading unit 3 is equal to the optical distance between the marker 4A and the reading unit 3. Therefore, even though the reading unit 3 undergoes some change resulting in inclined optical path, the relationship between the article 2 and the reading point of the marker 4A through the half mirror 6 is not broken, enabling the precision of the measurement to be improved.

Although the apparatus of the present invention has been described with reference to an embodiment where the reading unit 3 is moved, the apparatus may be constructed so that the table 1 and the marker plate unit 7 are moved in a one- and/or two-dimensional direction instead of the reading unit 3. Further, according to the above embodiment, the marker plate 4 and the half mirror unit 6 are integral with each other to constitute the marker plate unit 7. They, however, may be independent of each other.

As described above, in the apparatus for measuring the dimension of an article according to the present invention, an article to be measured and a marker are disposed so that the optical distance between the article and a reading unit is equal to the optical distance between the marker and the reading unit. This can eliminate the occurrence of parallax, resulting in satisfactory improved precision of the measurement.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An apparatus for measuring the dimension of an article, comprising:

a table having a first flat surface on which said article to be measured is placed;

a marker plate disposed on a second flat surface parallel to the first flat surface, said marker plate having a marker representing a unit of measurement including a coordinate, a dimension or an angle;

half mirror means disposed on a third flat surface located at a position where the optical distance between the article and the half mirror means is equal to the optical distance between the marker and the half mirror means; and reading means for reading a value corresponding to an arbitrary point on the article and a value, of the marker on the marker plate, corresponding to said arbitrary point by taking advantage of light transmitted through and light reflected from the half mirror means.

2. The apparatus as defined claim 1, wherein, in the measurement, the table, the marker plate and the half mirror means are stationary with the reading means being moved in a one- or two-dimensional direction.

3. The apparatus as defined in claim 1, wherein, in the measurement, the reading means is stationary with the table, the marker plate and the half mirror means being moved in a one- or two-dimensional direction.

4. The apparatus of claim 1 wherein said marker plate comprises glass.

5. The apparatus of claim 1 wherein said half mirror means comprises a dichroic mirror.

6. An apparatus for measuring a dimension of an article comprising:

a flat surface for supporting an article to be measured;

a marker plate disposed parallel to said flat surface, said marker plate having a marker thereon for measuring the article;

a half mirror disposed parallel to said flat surface so that the optical distance from the article to said half mirror is equal to the optical distance from said half mirror to said marker; and an image sensor for sensing a point on the article related to the dimension to be measured and for sensing a value of said marker on said marker plate which corresponds to the point by taking advantage of light transmitted through and light reflected from said half mirror.

7. An apparatus for measuring the dimension of an article, comprising:

a table having a flat first surface on which the article to be measured is placed;

a marker plate disposed on a flat second surface parallel to said first surface, said marker plate having a marker representing a unit of measurement including a coordinate, a dimension or an angle;

optical reading means for selectively reading an arbitrary point on said article and a value of said marker on said marker plate by means of a focusing system, said value of said marker corresponding to said arbitrary point, and said focusing system having a focus depth less than a distance between the article and said marker plate.

* * * * *